Nov. 19, 1957     P. W. GRIFFIN ET AL     2,813,988
MECHANICALLY ACTIVATED SOURCE OF ELECTRICAL ENERGY
Filed July 14, 1955

INVENTORS
*Pervy W. Griffin*
*Dean C. Siewers*

BY
*W. E. Thibodeau, A. W. Pew & J. D. Edgerton*
ATTORNEYS

2,813,988
MECHANICALLY ACTIVATED SOURCE OF ELECTRICAL ENERGY

Pervy W. Griffin, Dunn Loring, Va., and Dean C. Siewers, Bethesda, Md., assignors to the United States of America as represented by the Secretary of the Army Application July 14, 1955, Serial No. 522,186

7 Claims. (Cl. 310—10)

(Granted under Title 35, U. S. Code (1952), sec. 266)

The invention described herein may be manufactured and used by or for the Government for governmental purposes without the payment to us of any royalty thereon.

This invention relates to devices for producing electrical energy. In a preferred form of the invention a permanent-magnet body of ferrite or other frangible magnetic material is surrounded by a coil of wire. Means are provided for applying a mechanical force to the magnetic body, causing the body to break up into a number of fragments. This breaking up of the magnetic body is accompanied by a partial or complete collapse of the magnetic field associated with the body. The collapse of the magnetic field causes electrical energy to be induced in the coil. The energy thus induced is stored in electrical form for later use or is applied directly to a load or utilization device.

An object of the invention is to provide a reserve-type electrical power supply having long shelf life and adapted to be rapidly activated when power is required.

Another object is to provide a device, having a long shelf life and requiring no external source of electrical power, that will generate a pulse of electrical energy in response to a mechanical force.

Other objects, aspects, uses, and advantages of the invention will become apparent from the following description and from the accompanying drawing, in which.

Figure 1:
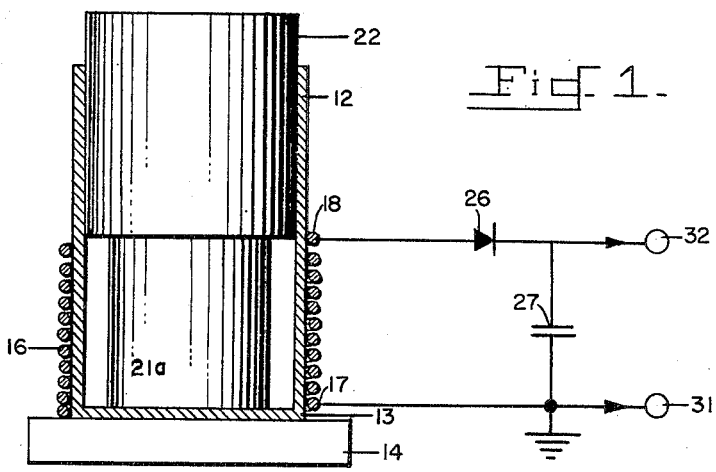
Figure 1 shows a longitudinal section of an electrical energy source in accordance with the invention.

In Fig. 1, a cup-shaped coil form 12 having a bottom piece 13 is supported on an anvil 14 having substantial mass and inertia. A coil of wire 16 having ends 17 and 18 is wound on form 12. A frangible permanently magnetized magnetic body 21a is supported inside coil form 12 on bottom piece 13. An impact pin 22, preferably of a hard metal and preferably cylindrical, fits slidably inside the upper portion of coil form 12, resting on magnetic body 21a. End 17 of coil 16 is connected to a first output terminal 31. End 18 of coil 16 is connected through a unilateral conducting device 26, which may conveniently be a diode of the germanium or selenium type, to a second output terminal 32. The polarity with which unilateral conducting device 26 should be connected will be understood from what follows. A storage capacitor 27 is connected across output terminals 31 and 32.

It will be understood that application of a sufficient downward force to impact pin 22 will cause frangible permanently-magnetized magnetic body 21a to break up into a number of fragments; that this breaking up will be accompanied by a partial or complete collapse of the magnetic field associated with body 21a; that during this collapse magnetic lines of force will cut coil 16; that this cutting of coil 16 by magnetic lines of force will produce a unipotential electrical pulse between ends 17 and 18 of coil 16, the polarity of the pulse being dependent upon the direction of winding of coil 16; that unilateral conducting device 26, if connected with proper polarity to pass this pulse, will permit this pulse to charge capacitor 27 and will, after the pulse has subsided, substantially prevent the charge stored in capacitor 27 from being discharged through coil 16; and that the charge stored in capacitor 27 may be delivered to a desired load by connecting the load to output terminals 31 and 32.

It is generally preferable to make body 21a substantially smaller in diameter than the inner diameter of coil form 12, so that there will be room for the fragments of body 21a to spread out laterally when body 21a is crushed by impact pin 22. Alternatively or in addition, it may be desirable to provide body 21a with one or more hollow spaces.

Figure 2:
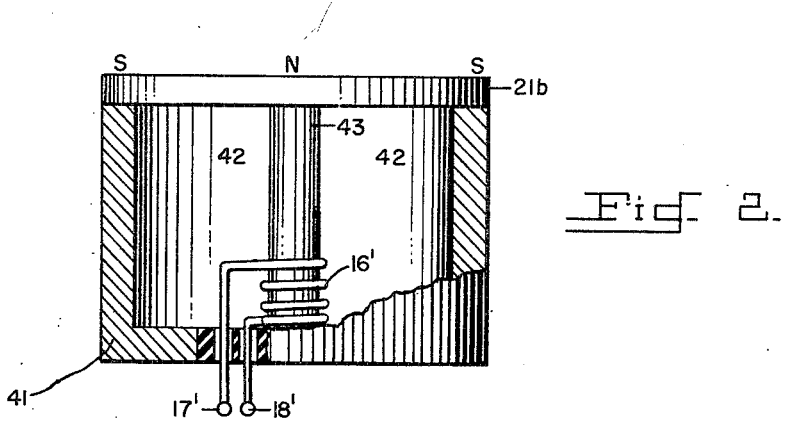
Figure 2 shows a longitudinal section of another electrical energy source in accordance with the invention.

In Fig. 2, a frangible permanently magnetic body 21b is in the form of a disk having a central N pole and an annular S pole in the region of its outer edge. A generally cylindrical keeper 41, having an annular cavity 42 and an axial member 43, provides a magnetic path between the central N pole and the annular S pole of body 21b. Keeper 41 is preferably of a material having a low energy product, such as one of the low-energy ferrites. This arrangement provides a high magnetic flux in axial member 43. Coil 16' surrounds axial member 43. If either body 21b or keeper 41 or both are mechanically shattered, it will be understood that the magnetic field in which coil 16' is located will substantially collapse and that a unipotential electrical pulse will appear between ends 17' and 18' of coil 16'.

Magnetic bodies 21a and 21b should preferably be of a hard, brittle material adapted to shatter or crush readily in response to impact. The magnetic properties of the material should preferably include high coercive force and high energy product. A body having these properties will, in response to a relatively small amount of applied mechanical energy, release a relatively large amount of stored magnetic energy and produce a relatively large amount of electrical energy. Of magnetic materials presently available, the permanent-magnet ferrites—and especially the barium ferrites—are particularly suitable. However, other materials, including hard steel and powdered-iron type materials, may be used.

It can be shown by calculation that approximately $3.1 \times 10^4$ ergs/cm.$^3$ ($=3.1 \times 10^{-2}$ watt-seconds/cm.$^3$) can be stored in non-oriented barium ferrite in the form of magnetic energy. For oriented magnetic ferrite the corresponding figures are approximately $8.3 \times 10^4$ and $8.3 \times 10^{-2}$. This amount of energy in 1 cm.$^3$ of oriented barium ferrite, if transferred entirely to a 0.05 microfarad capacitor, would charge the capacitor to approximately 400 volts.

It will be apparent that the embodiments shown are only exemplary and that various modifications can be made in construction and arrangement within the scope of the invention as defined in the appended claims.

We claim:

1. A device for producing an electrical impulse, comprising: a frangible permanently magnetized body, said body producing a magnetic field that is substantially invariant while said device is in the quiescent state; an electrical conductor located in said magnetic field, said conductor having two ends; means responsive to a mechanical force for fracturing said body to produce a plurality of fragments, said fracturing producing a rapid decrease in said magnetic field and causing a pulse of electrical energy to be developed in said conductor; and output means for applying the electrical energy developed in said conductor to a load.

2. The invention according to claim 1, said body being a ferrite body and said conductor being in the form of a coil.

3. The invention according to claim 1, said body being in contact with a keeper of a magnetic material having low energy product relative to the energy product of said body, said keeper being so shaped as to provide a magnetic path between first and second regions of N and S magnetic polarity respectively of said body, said conductor being in the form of a coil surrounding a portion of said keeper in which there is a relatively high magnetic flux due to said body.

4. The invention according to claim 1, said load comprising: an energy storage device; and a unilateral conducting device interposed between said conductor and said energy storage device, the polarity of said device being such that energy is permitted to flow from said conductor into said energy storage device upon the fracturing of said body and such that energy is inhibited from flowing from said storage device into said conductor.

5. The invention according to claim 4, said body being a ferrite body and said conductor being in the form of a coil.

6. The invention according to claim 5, said energy storage device being a capacitor and said unilateral conducting device being a solid-state rectifier.

7. The invention according to claim 6, there being additionally provided a loading mass at one end of said body and an impact pin at the other end of said body, the application of force to said impact pin being adapted to crush said body.

No references cited.